United States Patent
Ikeda (10) Patent No.: US 8,085,300 B2
(45) Date of Patent: Dec. 27, 2011

(54) SURVEILLANCE CAMERA SYSTEM, REMOTE-CONTROLLED MONITORING DEVICE, CONTROL METHOD, AND THEIR CONTROL PROGRAM

(75) Inventor: Yukio Ikeda, Kanagawa (JP)

(73) Assignee: Sony Corporation, Toyko (JP)

( * ) Notice: Subject to any disclaimer, the term of this patent is extended or adjusted under 35 U.S.C. 154(b) by 1543 days.

(21) Appl. No.: 11/428,975

(22) Filed: Jul. 6, 2006

(65) Prior Publication Data

US 2007/0064104 A1    Mar. 22, 2007

(30) Foreign Application Priority Data

Sep. 20, 2005   (JP) .................................. 2005-272158

(51) Int. Cl.
*H04N 7/18* (2006.01)
*G03B 17/00* (2006.01)

(52) U.S. Cl. ......................................... 348/150; 396/57
(58) Field of Classification Search .................. 348/150, 348/151, 143, 153, 158, 211.99; 345/760; 356/57

See application file for complete search history.

(56) References Cited

U.S. PATENT DOCUMENTS

| | | | | |
|---|---|---|---|---|
| 5,111,288 A | * | 5/1992 | Blackshear | 348/143 |
| 5,517,236 A | * | 5/1996 | Sergeant et al. | 348/143 |
| 6,320,614 B1 | * | 11/2001 | Kawashima | 348/211.99 |
| 6,400,401 B1 | | 6/2002 | Morino et al. | |
| 6,771,896 B2 | * | 8/2004 | Tamura et al. | 396/57 |
| 7,098,940 B2 | * | 8/2006 | Suzuki et al. | 348/143 |
| 2002/0075307 A1 | * | 6/2002 | Alexander et al. | 345/760 |

FOREIGN PATENT DOCUMENTS

| | | |
|---|---|---|
| JP | 7-298116 | 11/1995 |
| JP | 9-186923 | 7/1997 |
| JP | 2001-268556 | 9/2001 |
| JP | 2002-359766 | 12/2002 |

\* cited by examiner

*Primary Examiner* — Gims Philippe
(74) *Attorney, Agent, or Firm* — Oblon, Spivak, McClelland, Maier & Neustadt, L.L.P.

(57) ABSTRACT

A surveillance camera system includes a surveillance camera having pan/tilt capability, a display for displaying images picked-up by the surveillance camera thereon, a pointing device for indicating the movement of the surveillance camera in a visual field direction, and a remote-controlled monitoring device including a control unit for displaying the images on the display and for displaying a pointer thereon indicating the coordinate position of the pointing device so as to overlap with the images, and when the pointer is moved from a first point to a second point on the images, the control unit transmits a predetermined control signal from the remote-controlled monitoring device to the surveillance camera, and by the control signal, the control unit moves the surveillance camera in the moving direction of the pointer at a speed proportional to the length between the first point and the second point.

16 Claims, 7 Drawing Sheets

FIG. 1A
CLICKING

FIG. 1B
DRAGGING

FIG. 2A
CAMERA IS MOVED

FIG. 2B
POINT P2 IS MOVED

SURVEILLANCE CAMERA SYSTEM, REMOTE-CONTROLLED MONITORING DEVICE, CONTROL METHOD, AND THEIR CONTROL PROGRAM

CROSS REFERENCES TO RELATED APPLICATIONS

The present invention contains subject matter related to Japanese Patent Application JP 2005-272158 filed in the Japanese Patent Office on Sep. 20, 2005, the entire contents of which are incorporated herein by reference.

BACKGROUND OF THE INVENTION

1. Field of the Invention

The present invention relates to a surveillance camera system, a remote-controlled monitoring device, a control method, and their control program.

2. Description of the Related Art

Figure 8:
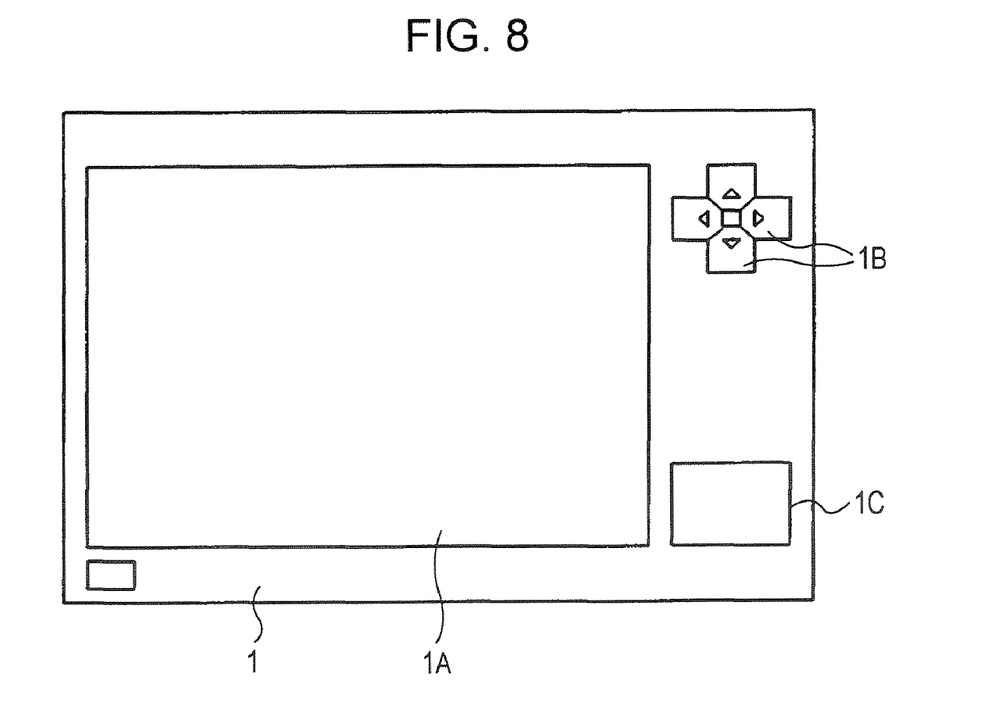
FIG. 8 is a drawing for illustrating a conventional example.

In this specification, "the movement of the surveillance camera in a line of sight" is abbreviated as "the movement of the surveillance camera" in brevity. A surveillance camera system for monitoring a traffic situation from a remote place includes a system having pan/tilt capability. In such a surveillance camera system, methods of the panning/tilting of a surveillance camera are known as follows: (A) as shown in FIG. 8, a picture taken by the surveillance camera is displayed on a surveillance picture area 1A of a monitor display picture frame 1 while buttons 1b for moving the camera in four directions (or eight directions) are displayed sideways, and when a mouse is clicked on any one of the buttons 1b, the surveillance camera moves in the clicked direction of the button during the clicking; (B) as shown in FIG. 8, a tablet 1C is displayed by the surveillance picture area 1A, and when the mouse is clicked on the tablet 1C or dragged therewith, the surveillance camera moves in the corresponding direction; (C) when the mouse is dragged with an arbitrary point 1A in the surveillance picture area 1A as a modification of the item (B), the surveillance camera moves by the dragging length in the dragging direction; (D) when the mouse is clicked on an arbitrary point in the surveillance picture area 1A or is selected in a square, the surveillance camera moves so that the clicked point or the square center is located in the center of the surveillance picture area 1A; (E) a panoramic picture is prepared by taking the entire range of pictures capable of shooting with the surveillance camera in advance, and when the mouse is clicked on an arbitrary point in the panoramic picture, the surveillance camera moves to the point; and (F) dedicated hardware such as a joy stick is used.

Prior art documents include Japanese Unexamined Patent Application Publication No. 2001-268556.

SUMMARY OF THE INVENTION

However, in the items (A) and (B), when tracking a movable body such as a vehicle, observer's eyes move between the surveillance picture area 1A and the buttons 1b or the tablet 1C, so that the movable body may not be stably tracked.

In the items (A) to (D), although the operationality has no problem when the surveillance camera is moved within the surveillance picture area 1A, it is necessary to repeat the stopping/moving when the surveillance camera is moved outside the surveillance picture area 1A, deteriorating the operability. When the picture is displayed on a different display or when the recorded picture is reproduced, the surveillance camera moves while the stopping/moving is repeated, becoming the unseemly picture.

Furthermore, in the item (E), although the surveillance picture area may be specified from the wide visual range, the same problem as that mentioned above arises in the operational situations other than that. In the item (F), although the operability close to the observer's sensibility can be obtained because the surveillance camera is determined by the inclination and the direction of the joy stick, the dedicated hardware is required, increasing cost when the surveillance display is configured by a general personal computer. Moreover, the responsiveness largely depends on the performance of the joy stick (the resolution of the inclination and the direction, accuracies, backlash, and a communication speed).

It is desirable to solve the problems described above in the present invention.

A surveillance camera system according to the present invention includes a surveillance camera having pan/tilt capability, a display for displaying images picked-up by the surveillance camera thereon, a pointing device for indicating the movement of the surveillance camera in a visual field direction, and a remote-controlled monitoring device, in which the remote-controlled monitoring device includes a control unit for displaying the images picked-up by the surveillance camera on the display and for displaying a pointer thereon indicating the coordinate position of the pointing device so as to overlap with the images, in which when the pointer is moved by the operation of the pointing device from a first point to a second point on the images picked-up by the surveillance camera, the control unit transmits a predetermined control signal from the remote-controlled monitoring device to the surveillance camera, and in which by the control signal, the control unit moves the surveillance camera in the moving direction of the pointer at a speed proportional to the length between the first point and the second point.

According to the present invention, the surveillance camera may be operated simply and viscerally. Also, an observer may not avert one's gaze from a monitoring object. Furthermore, dedicated operating means is not required and the camera can be operated by remote control only with a standard mouse. During the remote controlling, the movement direction and the speed can be freely controlled. As a result, the operability close to the observer's sensibility can be obtained.

DESCRIPTION OF THE PREFERRED EMBODIMENTS

[1] Outline

FIGS. 1A to 2B are drawings for illustrating an operation method of a surveillance system and a display state of a surveillance picture according to the present invention.

A picture plane 41 shows a surveillance display, and a rectangular area in the picture plane 41 other than a right portion and a lower portion is designated as a surveillance picture area 42. On the right of the picture plane 41, there are provided zoom buttons 43Z, manual focusing buttons 43F, an auto-focusing button 43A, and direction buttons 43D for providing interchangeability with conventional apparatus.

Furthermore, in the lower portion of the picture plane 41, various operation buttons 43V are provided for recording and reproducing the images taken by the surveillance camera. These operation buttons are operated with a mouse. A mouse pointer MP is displayed so as to overlap with object images displayed on the surveillance picture area 42.

Figure 1A:
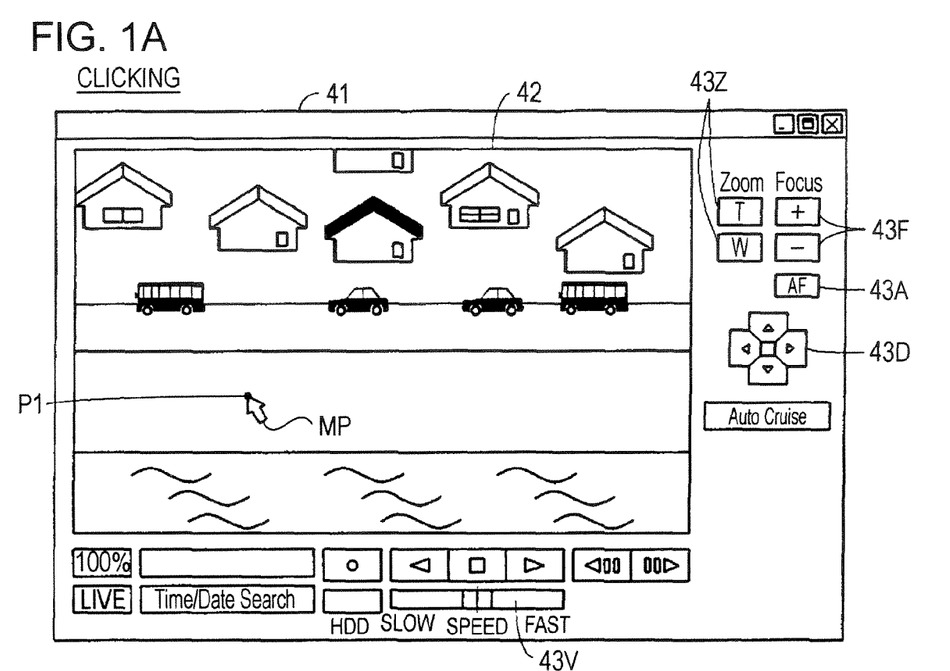
FIGS. 1A and 1B are drawings of an operation method and a surveillance picture of a system according to an embodiment of the present invention.
Figure 1B:
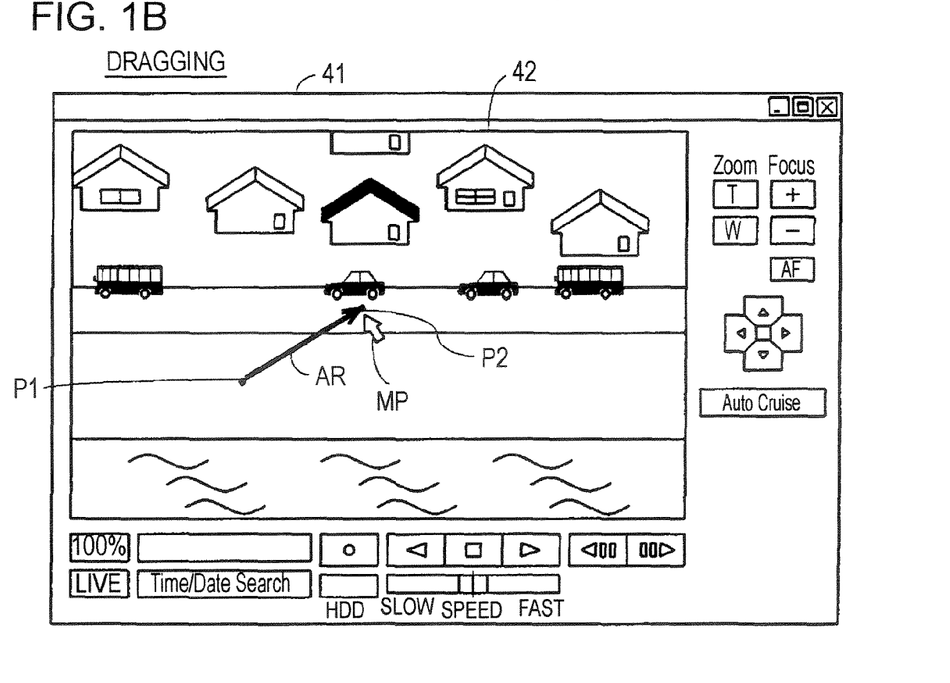
Figure 2A:
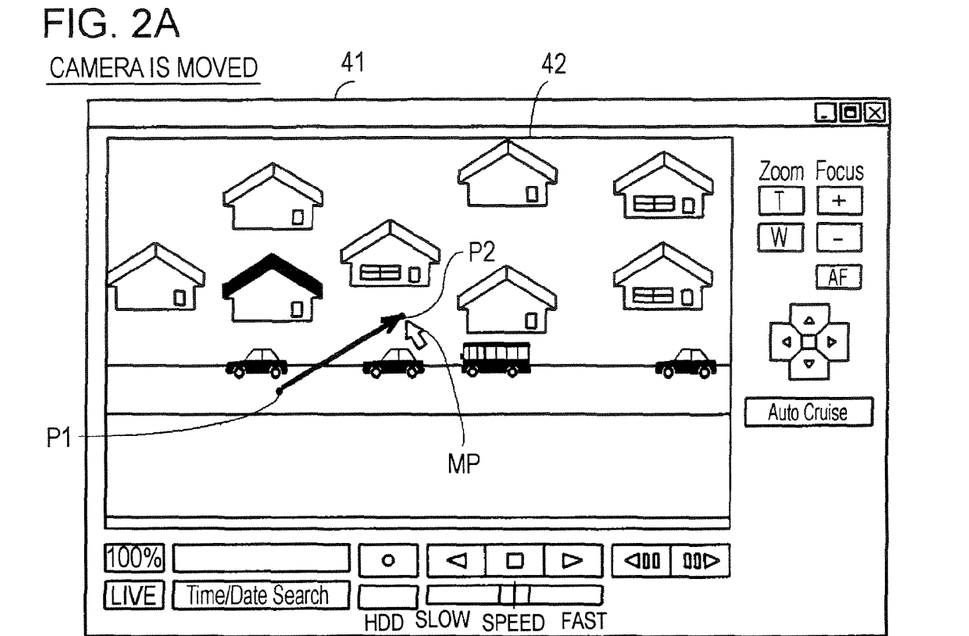
FIGS. 2A and 2B are drawings continued from FIGS. 1A and 1B.

Then, the operation of the surveillance camera is carried out as follows:

(1) As shown in FIG. 1A, a mouse is clicked on an arbitrary point (coordinate) P1 in the surveillance picture area 42 (the pushing of a mouse button is continued).
(2) As shown in FIG. 1B, the mouse is dragged from the point P1 to an arbitrary point (coordinate) P2 (the mouse pointer is moved while the mouse button is pushed).
(2-1) By this dragging, as shown in FIG. 1B, an arrow AR is depicted from the point P1 to the point P2.
(2-2) Simultaneously with depicting the arrow AR, as shown in FIG. 2A, the surveillance camera moves in the direction of the arrow AR at a speed proportional to the length of the arrow AR. Accordingly, the photographed images in the surveillance picture area 42 move in a direction reversed to the arrow AR.
(2-3) In this case, the depicting of the arrow AR and the movement of the surveillance camera are carried out by detecting the coordinate P2 of the mouse pointer MP at predetermined time intervals during dragging. Hence, as shown by a broken line in FIG. 2B, when the coordinate P2 of the mouse pointer MP is continuously moved, the surveillance camera continuously moves corresponding to the direction of the arrow AR.
(3) When the surveillance camera is directed in the aimed visual field direction, the mouse dragging is cancelled (the pushing of the mouse button is released).
(3-1) Then, the arrow AR in the surveillance picture area 42 vanishes and the surveillance camera is also stopped. Thus, the surveillance camera is stopped so as to direct it in the aimed visual field direction.

When the mouse is operated in such a manner, the mouse may be operated within the range of the surveillance picture area 42, so that an observer need not so much follow the glance thereon, facilitating the surveillance. In particular, when tracking a movable body such as a vehicle, this can be stably executed.

When the mouse is operated, as shown in FIG. 2A, the surveillance camera moves in the direction of the arrow AR at a speed proportional to the length of the arrow AR, so that even when the surveillance camera is moved outside the surveillance picture area 42, it can be continuously moved without repeating the moving and the stopping.

As the surveillance camera is continuously moving, when the picture is displayed on a different display or when the recorded picture is reproduced, the visual field direction is smoothly moved, facilitating to be viewed.

Furthermore, since the movement of the surveillance camera can be controlled with the mouse, specific hardware is not needed, and moreover the sufficient responsiveness for the movement resolution, accuracies, and a communication speed can be obtained.

[2] System Details

[2-1] Configuration of Each Section

Figure 3:
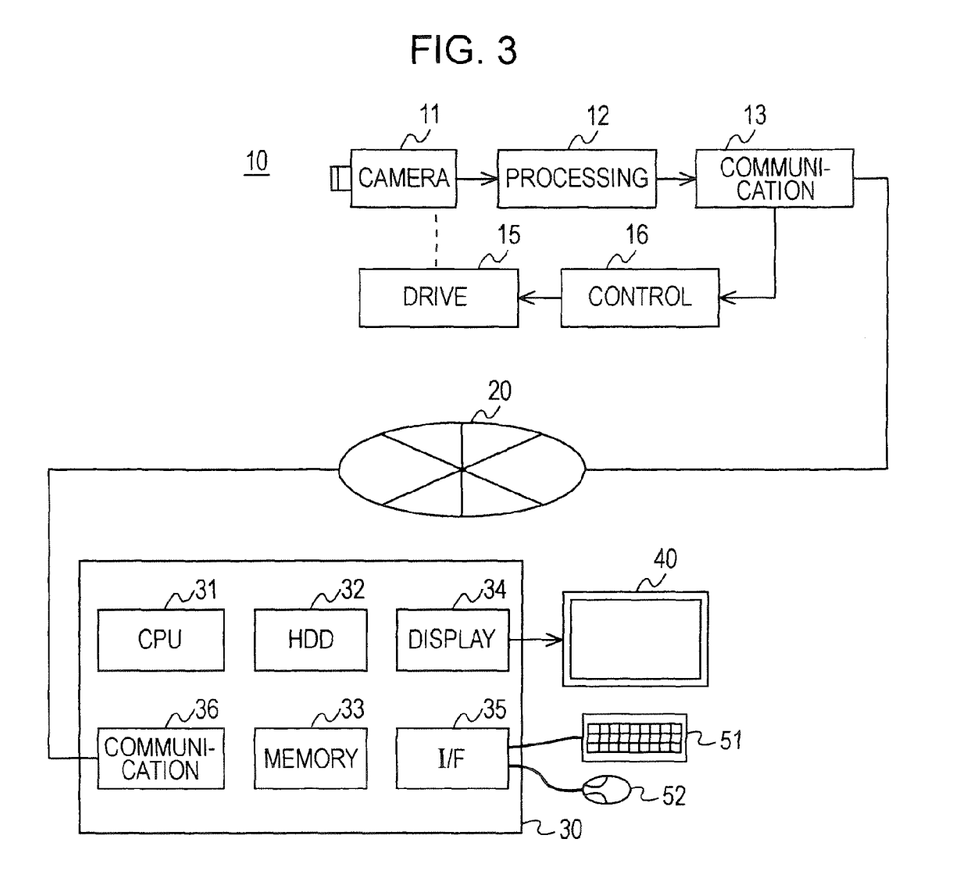
FIG. 3 is a drawing of the entire system according to the embodiment of the present invention.

FIG. 3 shows an entire configuration of a surveillance system according to the present invention, in which reference numeral 10 denotes a surveillance camera, numeral 20 a network such as Internet, and numeral 30 a remote-controlled monitoring device.

The surveillance camera 10 includes a video camera body 11, a signal processing circuit 12, and a communication circuit 13. The video camera body 11 is for taking a picture of a monitoring object and in view of night photography, it includes an infrared video camera according to the embodiment.

The signal processing circuit 12 executes processing, such as AGC (automatic gain control), γ correction, and A/D (analogue to digital) conversion, on the video signal outputted from the video camera body 11. Furthermore, the communication circuit 13 transmits the video signal from the signal processing circuit 12 to the remote-controlled monitoring device 30 via the network 20, while receiving various kinds of signals sent from the remote-controlled monitoring device 30 via the network 20.

The surveillance camera 10 also includes a drive mechanism 15 and a control circuit 16. The drive mechanism 15 mechanically moves the video camera body 11 so as to achieve the panning/tilting by the control of the control circuit 16. In this case, the speed of the video camera body 11 is changeable. When a control command and a parameter are supplied to the control circuit 16, according to the control command and the parameter, the control circuit 16 controls the drive mechanism 15 so as to control the movement direction and the speed of the video camera body 11.

That is, when a control command for instructing the video camera body 11 to start moving and parameters showing a speed component VX in the panning direction (horizontal direction) and a speed component VY in the tilting direction (vertical direction) are supplied to the control circuit 16, the video camera body 11 starts moving at the horizontal speed VX and at the vertical speed VY shown by the parameters so as to continue to move thereafter. When a control command for instructing the video camera body 11 to stop moving is supplied, the video camera body 11 stops moving.

Furthermore, the remote-controlled monitoring device 30 operates the surveillance camera 10 by remote control while displaying images taken by the surveillance camera 10, and it includes a personal computer according to the embodiment. The personal computer 30 may have a general specification so that the detailed description is omitted. It includes a CPU (central processing unit) 31 for executing a program, a hard disk 32 for storing the program and data, a memory 33 for a work area, a display control circuit 34, a user interface circuit 35, and a communication circuit 36.

Figure 4:
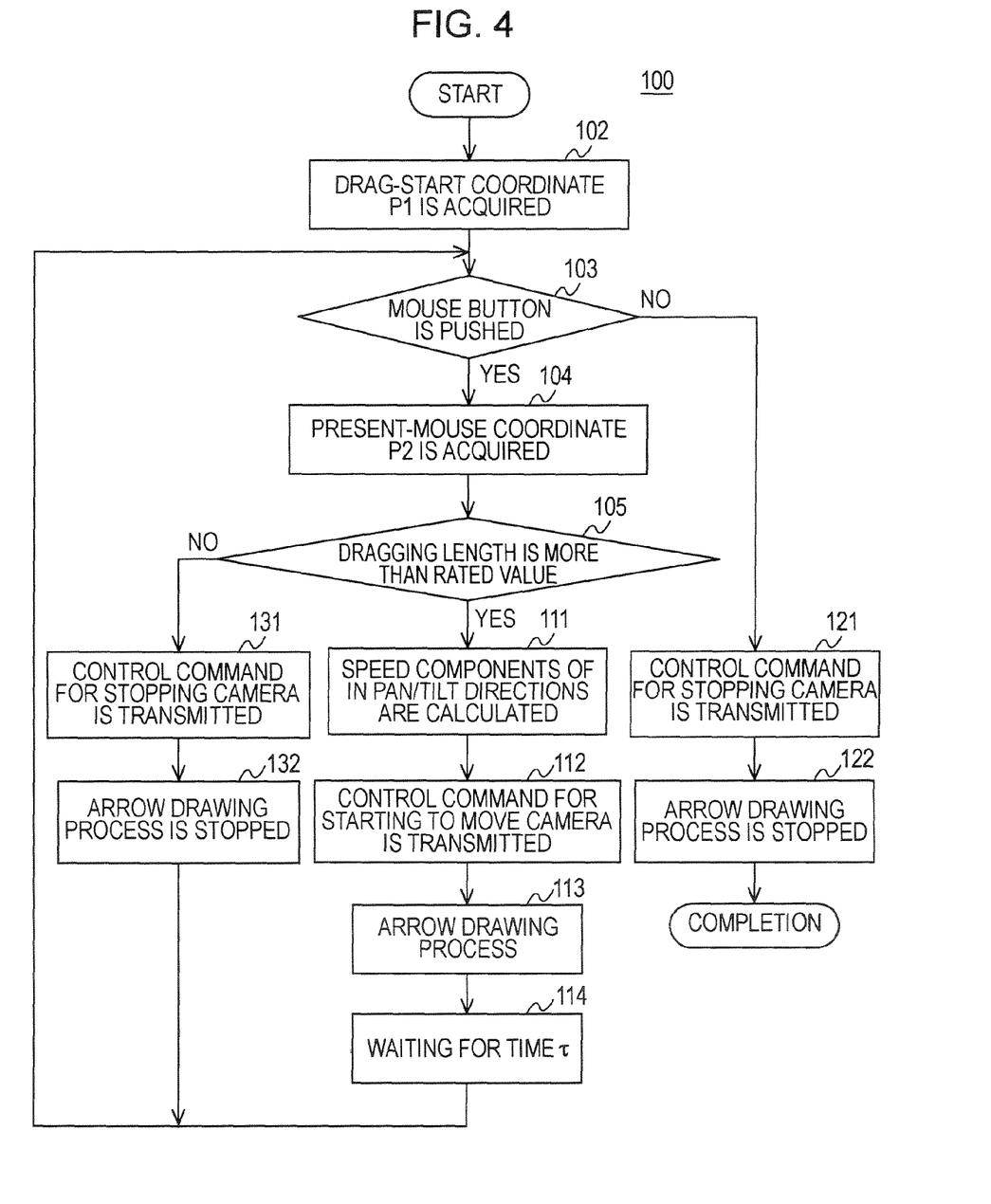
FIG. 4 is a flowchart of a manipulation routine according to the embodiment of the present invention.

In this case, the hard disk 32 is provided with software prepared for displaying images taken by the surveillance camera 10 on a display 40 while being provided with a routine 100 shown in FIG. 4 prepared as part of the software. The routine 100 will be described later in detail. The routine 100, as described in the item [1], operates the surveillance camera 10 by remote control according to the operation of a mouse 52.

To the display control circuit 34, the display 40 is connected, and to the interface circuit 35, a keyboard 51 and the mouse 52 are connected. The communication circuit 36 communicates with the communication circuit 13 via the network 20. In this case, the displaying images on the picture plane 41 of the display 40 are the same as those described with reference to FIGS. 1A to 2B.

The video signal of the image taken with the surveillance camera 10 is supplied from the signal processing circuit 12 to the communication circuit 13, and is further transmitted from the communication circuit 13 to the personal computer 30 via the network 20. Then, in the personal computer 30, the video signal from the surveillance camera 10 is received to the communication circuit 36, and the received video signal is processed by the display control circuit 34 and supplied to the display 40.

Thus, the images taken with the surveillance camera 10 are displayed on the surveillance picture area 42 of the display 40 (FIGS. 1A to 2B), so that the situations taken with the surveillance camera 10 can be observed. During the observation, by operating the operation buttons 43V, the images displayed on the surveillance picture area 42 are recorded on the hard disk 32 or a dedicated server (not shown), and are reproduced when necessary.

At this time, when the mouse 52 is operated, the routine 100 is executed so that the surveillance camera 10 is moved by remote control as follows.

[2-2] Movement Process of the Surveillance Camera 10

The routine 100 shown in FIG. 4 is read out of the hard disk 32 so as to load it into the memory 33. Then, when the button of the mouse 52 is pushed, in the processing by the CPU 31 starting from Step 101 of the routine 100, at Step 102, the coordinate P1 of the mouse pointer MP at this time is obtained. Subsequently, at Step 103, the button of the mouse 52 is determined whether being pushed or not. When it is pushed, the process proceeds from Step 103 to Step 104, at which the coordinate P2 of the mouse pointer MP at this time is obtained.

Subsequently, at Step 105, a distance L12 between the coordinate P1 and the coordinate P2, i.e., the dragging length L12 is determined whether it is more than a rated value. If it is more than the rated value, the process proceeds from Step 105 to Step 111, at which the moving processing of the surveillance camera 10 is executed.

That is, at Step 111, the horizontal speed component VX and the vertical speed component VY are calculated from the dragging length L12 of the mouse 52 (the calculation method will be described in detail), and then, at Step 112, the control signal of the moving start is generated and transmitted to the surveillance camera 10 via the communication circuit 36. That is, a control command for instructing the video camera to start moving and parameters showing the speed component VX in the panning direction and the speed component VY in the tilting direction are formed and transmitted the surveillance camera 10.

Then, to the surveillance camera 10, this control signal is received from the communication circuit 13 via the network 20, and the received control signal is supplied to the control circuit 16. As a result, the video camera body 11 is controlled by the drive mechanism 15 so as to start moving at the horizontal speed component VX and at the vertical speed component VY according to the parameters of the transmitted control command and to continue moving thereafter.

Then, in the processing by the CPU 31 after Step 112, the process proceeds to Step 113, at which the depicting of the arrow AR connecting between the coordinate P1 and the coordinate P2 is executed. In this depiction, between the first coordinate P1 and the present coordinate P2, the arrow AR is newly depicted while the old arrow AR is erased. It is preferable that the arrow AR be distinctly discriminated from the surveillance picture, which is a background, so that according to the embodiment, the arrow AR is red because the video camera body 11 is a monochrome infrared video camera.

Then, at Step 114, a predetermined waiting time T is taken according to the responsive performance of the surveillance camera 10 and the processing capacity of the personal computer 30 and then, the process returns back to Step 103.

Figure 2B:
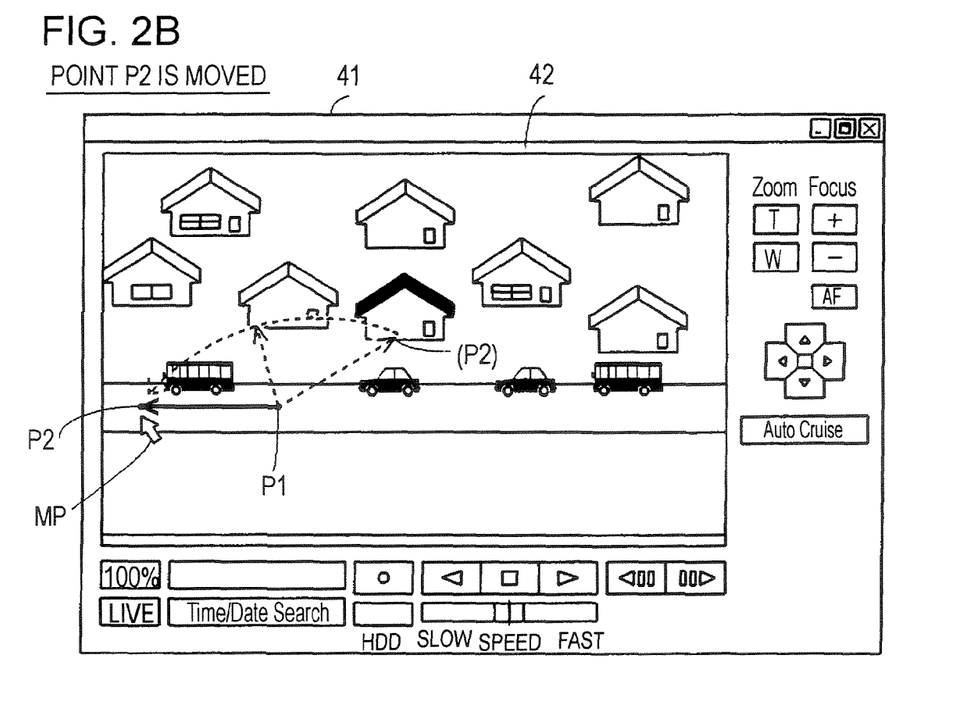

Hence, when the button of the mouse 52 is pushed, Steps 103 to 105 and Steps 111 to 114 are repeated with the cycle T, while the depiction of the arrow AR and the speed of the surveillance camera 10 are renewed every this repetition. As a result, when the mouse 52 is moved while the mouse button being pushed, as shown in FIG. 2B, between the first position P1 of the mouse pointer MP and the present position P2 of the mouse pointer MP, the arrow AR is depicted, while the surveillance camera 10 moves in the direction of the arrow AR at a speed corresponding to the length of the arrow AR.

Then, when the surveillance camera 10 is moved to the aimed visual field direction, if the button of the mouse 52 is released, this is determined by Step 103, so that the process proceeds from Step 103 to Step 121, at which a control command for instructing the camera to stop moving is generated, and is transmitted from the communication circuit 36 to the surveillance camera 10.

Then, in the surveillance camera 10, this control command is received from the communication circuit 13, and is supplied to the control circuit 16. As a result, the video camera body 11 is stopped moving by the drive mechanism 15. Furthermore, at Step 122, the depicting the arrow AR is stopped and then, at Step 123, the routine 100 is completed.

In addition, at Step 105, when the distance L12 between the coordinate P1 and the coordinate P2, i.e., the dragging length L12 of the mouse 52 is less than a rated value, the process proceeds from Step 105 to Step 131, at which, in the same way as in Step 121, a control command for instructing the camera to stop moving is generated, and is transmitted to the surveillance camera 10. Then, at Step 132, the depicting the arrow AR is stopped and then, the process returns back to Step 103. Therefore, if the dragging length L12 of the mouse 52 is leas than the rated value, the dragging is ignored.

In such a manner, according to the routine 100, as described in the item [1], when depicting the arrow AR by dragging the mouse 52, the surveillance camera 10 can be moved in the direction of the arrow AR at a speed proportional to the length of the arrow AR.

[3] Calculation Method of Speed of Surveillance Camera 10

Figure 5A:
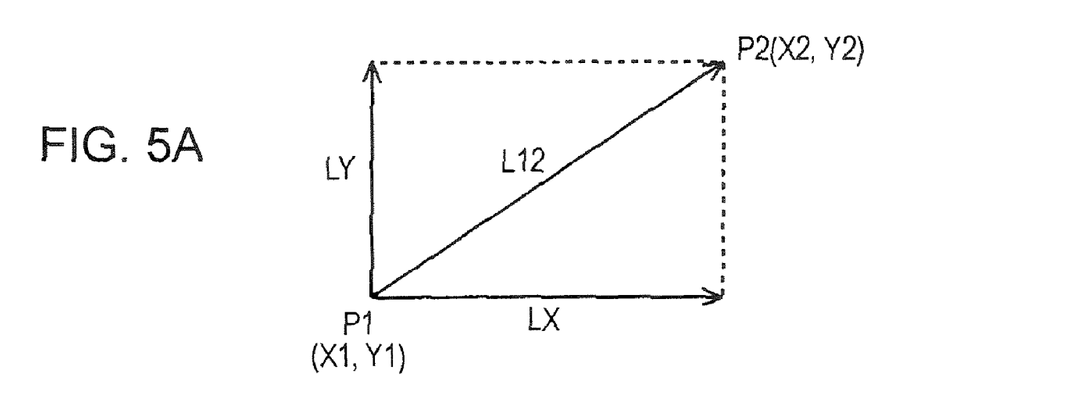
FIGS. 5A and 5B are drawings for illustrating the present invention.

The movement direction and speed of the surveillance camera 10 can be determined as shown in FIG. 5A, for example. That is, in FIG. 5A:

$$LX = X2 - X1$$

$$LY = Y2 - Y1 \quad (11),$$

where X1 and Y1 are X-coordinate and Y-coordinate of the coordinate P1, respectively; X2 and Y2 are X-coordinate and Y-coordinate of the coordinate P2, respectively; LX is the movement component of the mouse pointer MP in the panning direction (X-axis direction); and LY is the movement component of the mouse pointer MP in the tilting direction (Y-axis direction).

Here we set

VX=the speed component of the surveillance camera 10 in the panning direction

VY=the speed component of the surveillance camera 10 in the tilting direction, and equation (11) becomes:

$$VX = aX \cdot LX + bX$$

$$VY = aY \cdot LY + bY \quad (12),$$

where aX, bX, aY, and bY are predetermined constants.

In such a manner, at Step 111 of the routine 100, according to equation (12), the speed components VX and VY of the surveillance camera 10 in the panning direction and in the tilting direction can be calculated.

By associating the maximum and minimum values of the speed components VX and VY with the maximum and minimum dragging lengths in the surveillance picture area 42, respectively, the changeable range of the speed of the surveillance camera 10 can be entirely used. However, it is not necessarily to entirely use it.

Figure 5B:
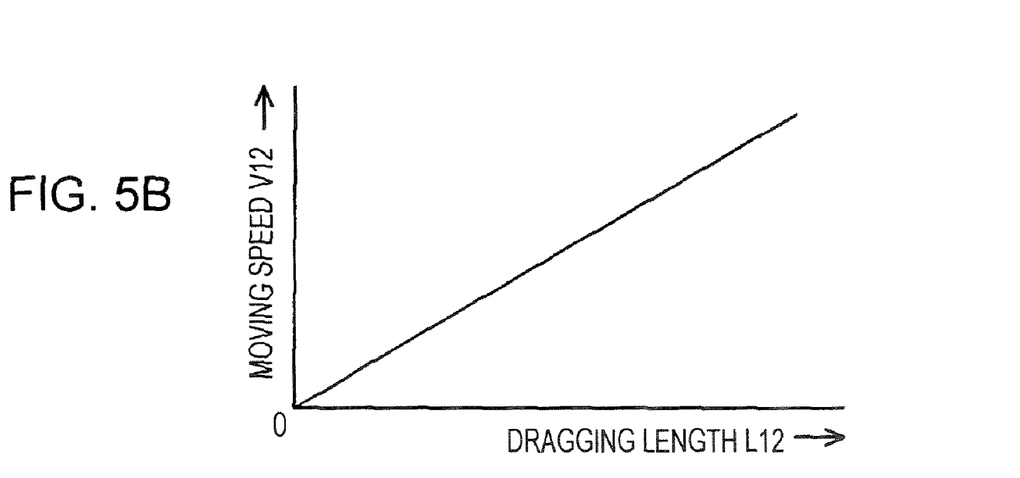

FIG. 5B shows the relationship between the dragging length L12 of the mouse 52 and the speed V12 of the surveillance camera 10. The speed V12 is the vector sum of the horizontal speed component VX and the vertical speed component VY, i.e., the speed in the direction of the arrow AR. In FIG. 5B, bX=bY=0, for brevity. In this case, the speed V12 is calculated from equation (12), so that the speed V12 linearly changes relative to the dragging length L12.

[4-1] Speed Control of the Surveillance Camera 10 (First)

Figure 6A:
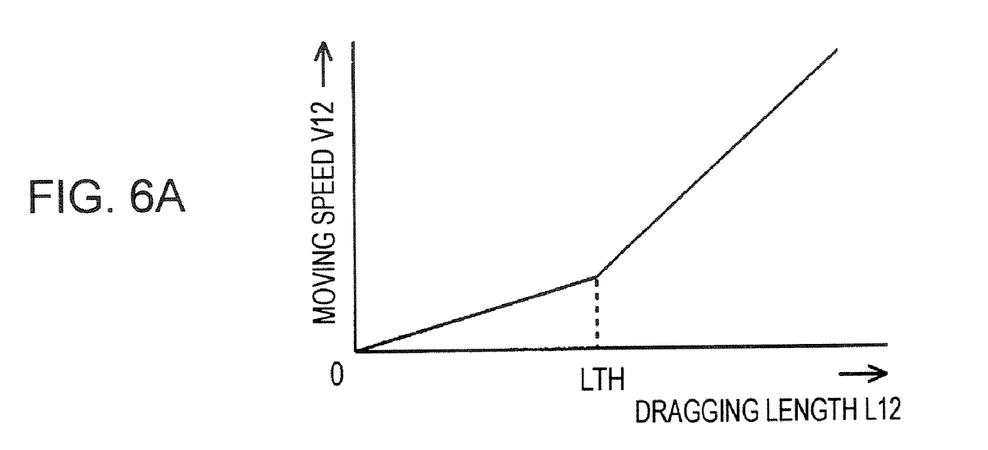
FIGS. 6A to 6C are drawings for illustrating the present invention.

In item [3], the speed V12 linearly changes relative to the dragging length L12; alternatively, as shown in FIG. 6A, it may non-linearly change. That is, in FIG. 6A, when the dragging length L12 is less than a rated value LTH, the rate of change of the speed V12 is small while when the dragging length L12 is more than the rated value LTH, the rate of change of the speed V12 is large.

Figure 6B:
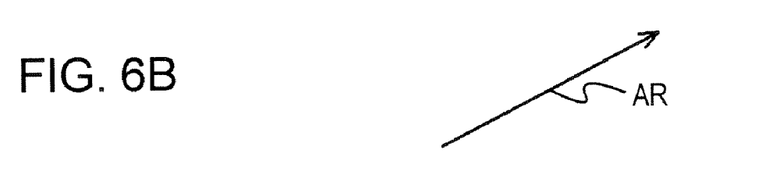
Figure 6C:
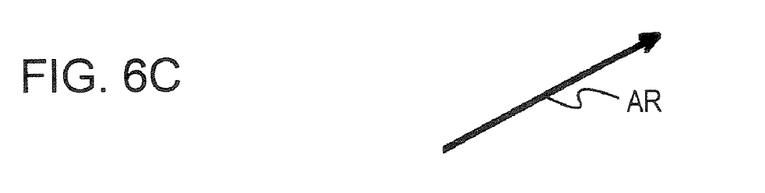

Furthermore, in this case, when the dragging length L12 is less than the rated value LTH, the arrow AR is depicted with fine lines as shown in FIG. 6B, and with cold color such as blue. When the dragging length L12 is more than the rated value LTH, the arrow AR is depicted with heavy lines as shown in FIG. 6C, and with warm color such as red.

In such a manner, in the range of L12<LTH, even when the mouse 52 is largely dragged, the surveillance camera 10 moves slowly, so that the slowly moving of the surveillance camera 10 is facilitated. In the range of L12≧LTH, when the mouse 52 is largely dragged, the surveillance camera 10 can be moved at a higher speed. Moreover, the rate of change of the speed V12 can be confirmed with the boldness and color of the arrow AR, improving operability.

[4-2] Speed Control of the Surveillance Camera 10 (Second)

Figure 7:
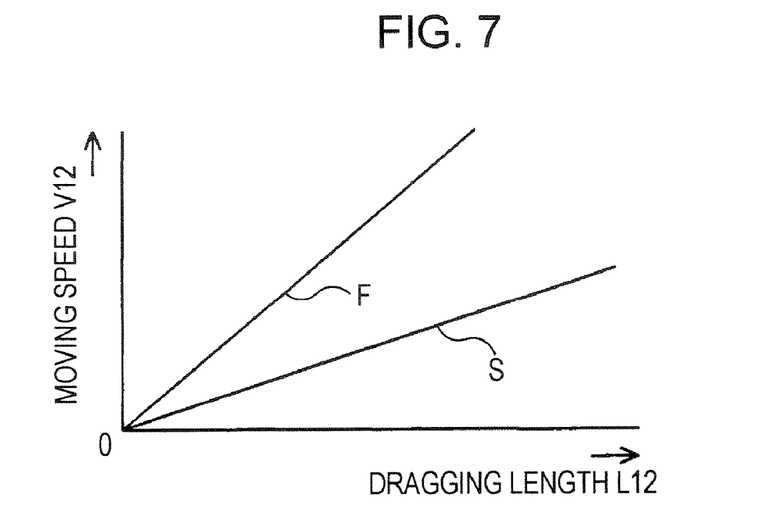
FIG. 7 is a characteristic diagram for illustrating the present invention.

Referring to FIG. 7, the rate of change of the speed V12 of the surveillance camera 10 relative to the dragging length L12 of the mouse 52 is changeable with two-step changes.

That is, when the mouse 52 is a two-button mouse, if the left mouse button is pushed, as shown in a straight line S, the rate of change of the speed V12 is small. If the right mouse button is pushed, as shown in a straight line F, the rate of change of the speed V12 is large.

Alternatively, when the button of the mouse 52 is only pushed, as shown in the straight line S, the rate of change of the speed V12 is small. If the mouse button is pushed while a specific key of the keyboard 51, such as a shift key, as shown in the straight line F, the rate of change of the speed V12 is large.

Also, in this case, when the rate of change of the speed V12 is small, the arrow AR is depicted with fine lines and with a color such as blue. When the rate of change of the speed V12 is large, the arrow AR is depicted with heavy lines and with a color such as red. Hence, the operability when moving the surveillance camera 10 is improved.

[5] Summary

In the surveillance camera system described above, the mouse 52 may be operated within the range of the surveillance picture area 42 while when the mouse 52 is operated, the surveillance camera 10 moves in the dragging direction of the mouse 52 at a speed proportional to the dragging length L12. Hence, the mouse 52 may be operated simply and viscerally. An observer may watch only the surveillance picture area 42, so that the observer may not avert one's gaze from the object.

Furthermore, it is not necessary to add operating means such as a joy stick, so that with only the standard mouse 52, the camera can be operated by remote control. During the remote controlling, the moving direction and the speed of the surveillance camera 10 can be freely controlled. Consequently, the surveillance with an observer's sensibility is nearly enabled.

The system described above is effective not only in a small-scale surveillance camera system composed of one surveillance camera and a personal computer but also in a wide-area surveillance camera system further including a zoom function.

[6] Others

In the above-description, during dragging, the dragging direction and the dragging length L12 of the mouse pointer MP may be recognized, so that the arrow AR may simply be a straight line. In items [4-1] or [4-2], the shape of the mouse pointer MP may be switched between whether the rate of change of the speed V12 is small or large, so that the rate of change of the speed V12 may be recognized from the shape of the mouse pointer MP.

As shown in FIG. 6 or 7, in changing the rate of change of the speed V12 of the surveillance camera 10, when the coordinate P1 is obtained at step 102, it is determined whether any one of the right and left mouse buttons is pushed or a shift key is pushed simultaneously with the mouse button. When calculating speed components VX and VY at step 111, according to the determined result, factors aX and aY may be changed.

Further, in the above-description, the rate of change of the speed V12 relative to the dragging length L12 is changeable with two-step changes; alternatively, it may be changeable with a further multistage or along a curve like exponentially. The rate of change of the speed V12 may also be changed by clicking the button displayed on the picture plane 41. Moreover, the permission/prohibition of depicting the arrow AR may also be selectable.

Also, in the above-description, the mouse 52 is used as a pointing device; alternatively, a track ball or a touch panel may be used. Further, when the speed of the surveillance camera 10 is not changeable, the surveillance camera 10 may be moved by a distance proportional to the values VX and VY shown in equation (12). In this case, by changing the waiting time τ at step 114, a dummy speed can be adjusted.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for controlling a photographing direction of a camera comprising:
   a display configured to display an image taken by the camera;
   an input configured to receive a command moving a cursor displayed on the display from at a first point to a second point; and
   a controller configured to change the photographing direction of the camera at a velocity determined by a positional relationship between the first point and the second point, wherein the display is configured to display a straight line extending from the first point to the second point when the input is received to move the cursor from the first point to the second point, and the display is configured to change at least one of a thickness and color of the straight line based on the velocity at which the photographing direction of the camera is changed.

2. The control apparatus according to claim 1, wherein when the cursor is moved from the second point to a third point on the display based on a command received at the input, the controller changes the photographing direction of the camera at a velocity determined by a positional relationship between the first point and the third point.

3. The control apparatus according to claim 1, wherein
the input is a mouse,
the first point corresponds to a point at which a button of the mouse is actuated,
the controller changes the photographing direction of the camera while the button is actuated and the mouse is used to move the cursor on the display, and
the controller stops changing the photographing direction of the camera when the button of the mouse is no longer actuated.

4. The control apparatus according to claim 1, wherein the input is a touch panel.

5. The control apparatus according to claim 1, wherein the controller is configured to change the photographing direction of the camera at a velocity proportional to a distance between the first point and the second point.

6. The control apparatus according to claim 1, wherein the controller is configured to change a rate at which the velocity of the photographing direction of the camera is changed based on a distance between the first point and the second point.

7. A system for controlling a photographing direction of a camera, the system comprising:
the camera configured to capture an image;
a remote-monitoring device comprising
a display configured to display an image taken by the camera;
an input configured to receive a command moving a cursor displayed on the display from at a first point to a second point; and
a controller configured to change the photographing direction of the camera at a velocity determined by a positional relationship between the first point and the second point, wherein
the display is configured to display a straight line extending from the first point to the second point when the input is received to move the cursor from the first point to the second point, and
the display is configured to change at least one of a thickness and color of the straight line based on the velocity at which the photographing direction of the camera is changed.

8. The system according to claim 7, wherein when the cursor is moved from the second point to a third point on the display based on a command received at the input, the controller changes the photographing direction of the camera at a velocity determined by a positional relationship between the first point and the third point.

9. The system according to claim 7, wherein
the input is a mouse,
the first point corresponds to a point at which a button of the mouse is actuated,
the controller changes the photographing direction of the camera while the button is actuated and the mouse is used to move the cursor on the display, and
the controller stops changing the photographing direction of the camera when the button of the mouse is no longer actuated.

10. The system according to claim 7, wherein the input is a touch panel.

11. The system according to claim 7, wherein the controller is configured to change the photographing direction of the camera at a velocity proportional to a distance between the first point and the second point.

12. The system according to claim 7, wherein the controller is configured to change a rate at which the velocity of the photographing direction of the camera is changed based on a distance between the first point and the second point.

13. A method for controlling a photographing direction of a camera comprising:
displaying, at a display, an image taken by the camera;
receiving, at an input, a command moving a cursor displayed on the display from at a first point to a second point;
changing, at a controller, the photographing direction of the camera at a velocity determined by a positional relationship between the first point and the second point; and
displaying, at the display, a straight line extending from the first point to the second point when the input is received to move the cursor from the first point to the second point; and
changing at least one of a thickness and color of the straight line at the display based on the velocity at which the photographing direction of the camera is changed.

14. The method according to claim 13, further comprising:
changing the photographing direction of the camera at a velocity determined by a positional relationship between the first point and a third point when the cursor is moved from the second point to the third point on the display based on a command received at the input.

15. The method according to claim 13, further comprising:
changing the photographing direction of the camera at a velocity proportional to a distance between the first point and the second point.

16. The method according to claim 13, further comprising:
changing a rate at which the velocity of the photographing direction of the camera is changed based on a distance between the first point and the second point.

* * * * *